United States Patent [19]
Bagwell

[11] 3,990,740
[45] Nov. 9, 1976

[54] HOPPER BED TARP VENT

[75] Inventor: James H. Bagwell, Great Bend, Kans.

[73] Assignee: Doonan Trailer Corporation, Great Bend, Kans.

[22] Filed: Aug. 19, 1975

[21] Appl. No.: 605,917

[52] U.S. Cl. ............................................. 296/100
[51] Int. Cl.$^2$ ......................................... B60P 7/02
[58] Field of Search .............. 296/100, 98; 135/14; 98/6; 62/326; 298/24, 27

[56] References Cited
UNITED STATES PATENTS

| | | | |
|---|---|---|---|
| 3,138,399 | 6/1964 | Hughes | 296/100 |
| 3,627,376 | 12/1971 | Tyler | 296/98 |
| 3,819,082 | 6/1974 | Rosenvold | 296/100 |

Primary Examiner—Robert R. Song
Attorney, Agent, or Firm—Lowe, Kokjer, Kircher, Wharton & Bowman

[57] ABSTRACT

Apparatus for venting a tarpaulin type covering which extends over an open top hopper car is provided by the present invention. An elongated member is adapted to be pivotally mounted near the top of the hopper bed and beneath the tarpaulin-like covering. The member is normally disposed in a parallel relationship with the overlying covering so as not to interfere with the latter and is movable into a venting position perpendicular to the covering whereby the latter is pulled away from the hopper bed. Lever means is coupled with the member and extends therefrom for effecting the pivotal movement of the member. An over center handle is coupled with the lever and serves to positively lock the member in its normal position. When the handle is moved to effect pivotal movement of the member, it may be placed in position to lock the member in its venting position.

9 Claims, 3 Drawing Figures

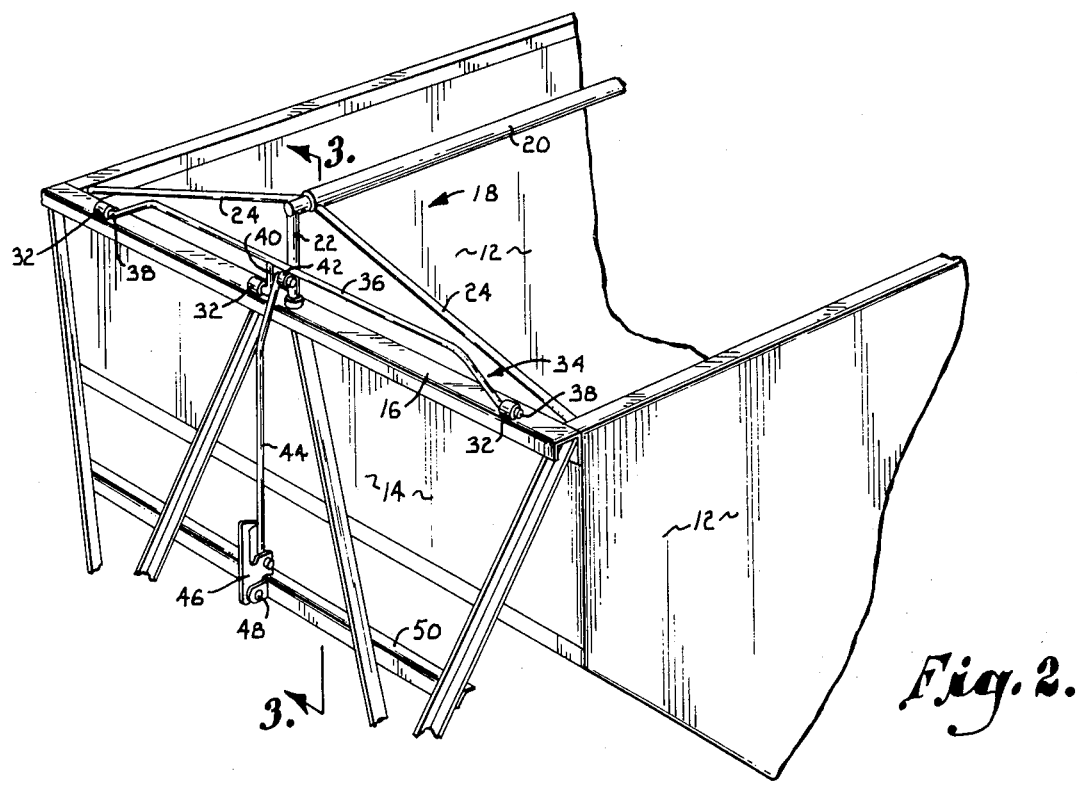
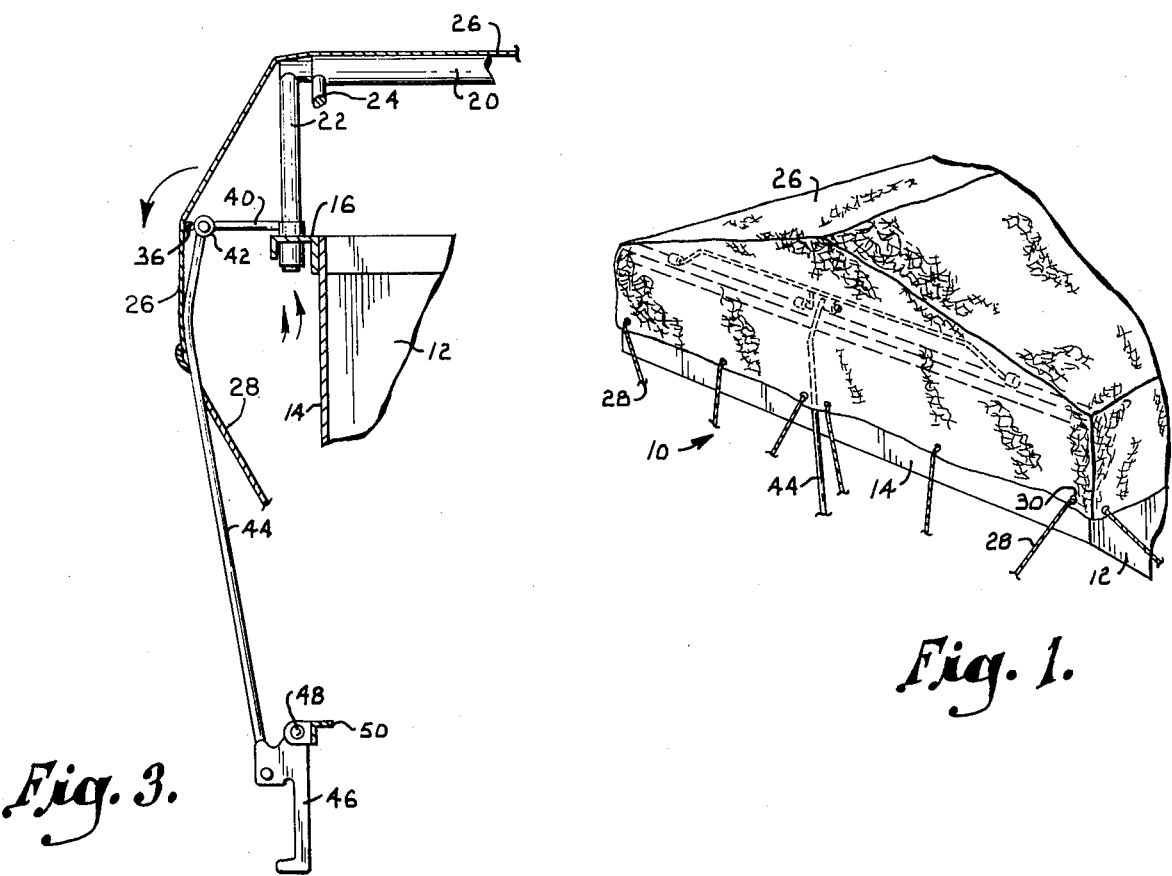
Fig. 2.
Fig. 3.
Fig. 1.

HOPPER BED TARP VENT

This invention relates generally to open top containers employing flexible coverings and, more particularly, to apparatus for holding open a flexible covering so as to vent a container while the latter is being emptied thereby preventing a large pressure differential from damaging the container.

Open top hopper bed trailers are widely used for hauling all types of commodities. In recent years, hopper bed trailers have been increasingly employed to transport agricultural products. Because these trailers are being moved over public roads with weight limitations, it has become extremely important to minimize the weight of the trailer so as to maximize the cargo capacity. Accordingly, hopper bed trailers for this type of usage are normally built from a very lightweight material. This also is important in keeping the cost of the trailer at a competitive level.

The extreme lightweight construction of many hopper bed type trailers has made them subject to collapse during unloading if precautions are not taken to equalize the pressure on the inside and outside of the hopper bed. These hopper bed trailers are normally provided with a flexible tarpaulin-like covering which is supported by an open framework on the top of the trailer and which extends a distance over the side of the trailer and is held by tie down ropes. If an adequate section of the tarpaulin is loosened to allow the entry of air during unloading of the cargo, there is no problem of pressure differential and the attendant "cave in" danger.

On the other hand, frequently drivers are in a hurry to unload and may not take the time to loosen enough of the tarpaulin so as to allow for an adequate air flow into the hopper bed. In some cases, the driver will loosen the tarpaulin but will not loosen it enough and the resulting partial pressure differential will pull the tarpaulin tight against the hopper bed thus resulting in cave in even though some attempt to loosen the covering was made. In still other instances inexperienced drivers will not know how much of the covering needs to be loosened in order to permit an adequate air flow and will underestimate.

It is therefore a primary object of the present invention to provide apparatus for venting a flexible covering over an open top hopper bed container so as to absolutely preclude any possible collapse of the hopper bed as a result of pressure differential during the unloading operation.

As a corollary to the above object, it is an important aim of this invention to provide apparatus as described which includes positive locking mechanism so as to preclude accidental opening of the covering during transport which could result in damage to the commodity during adverse weather.

Another corollary to the object above is to provide apparatus of the type described which includes positive locking means so as to hold the flexible covering open during the entire unloading operation and preclude any accidental closing of the covering which could result in collapse of the hopper bed.

It is also an important objective of this invention to provide apparatus as described in the foregoing aims and objects which is simple to operate and maintain.

Another object of the invention is to provide apparatus for positively venting a flexible covering on an open top hopper bed which is of rugged construction so as to preclude damage even if carelessly operated.

Another one of the aims of my invention is to provide apparatus for positively venting the flexible covering on a bed of an open top container which can be utilized with any type of container without requiring structural modification of either the container or the covering.

Other objects of the invention will be made clear or become apparent from the following description and claims when read in light of the accompanying drawing wherein:

FIG. 1 is a fragmentary perspective view of a hopper bed trailer provided with a flexible tarpaulin-like covering over its open top;

FIG. 2 is an enlarged fragmentary view of the hopper bed trailer shown in FIG. 1 illustrating the framework which supports the flexible covering as well as the apparatus for venting the covering according to the present invention; and FIG. 3 is a vertical cross-sectional view taken along line 3—3 of FIG. 2 and illustrating operation of the apparatus for venting the tarpaulin type covering.

Referring initially to FIG. 1 of the drawing, an open top hopper bed trailer is designated generally by the numeral 10 and includes opposed side walls 12 as well as an end wall 14. End wall 14 is provided with a reinforcing C-channel 16 along its uppermost peripheral edge.

Disposed atop the walls 12 and 14 is a framework designated generally by the numeral 18. Framework 18 includes a longitudinally extending center support 20 which is held in spaced relationship to C-channel 16 by a vertical leg 22. Extending angularly downward from center support 20 are opposed tie bars 24.

Framework 18 provides support for a flexible tarpaulin-like covering 26 which is complementally configured to the framework and the underlying trailer so as to fit tightly thereover. Covering 26 is held in place by tie ropes 28 which are passed through a plurality of eyelets 30 peripherally spaced around the terminal edge of the covering.

Welded to the top surface of C-channel 16 are three spaced apart tubular couplers 32. The two endmost couplers 32 receive the terminal ends of an elongated member 34 which is of generally U-shaped configuration with a stretched out bight portion 36 and outturned ends 38 which are received in the two endmost couplers and are generally parallel to bight portion 36. The third coupler 32 disposed intermediate the two end couplers receives an L-shaped depending leg 40 which is integral with bight portion 36.

Bight portion 36 is also provided with a rigid ring coupling 42 which receives one end of an elongated lever arm 44. Lever arm 44 extends downwardly from the member 34 and terminates with one end being received in an over center handle and lock 46. Handle 46 is pivotally mounted at 48 to a cross brace 50 extending transversely of end wall 14.

When the grain or other commodity within the confines of hopper bed 10 is emptied through a hopper door (not shown) in the bottom of the trailer, it is necessary to pull back the tarpaulin covering 26 so as to allow air to enter the inside of the trailer and prevent a partial vacuum which could collapse the side walls 12. Thus, before the hopper door is opened, handle 46 is moved from the upward position shown in FIG. 2 to the downward position shown in FIG. 3. This in turn effects pivotal movement of member 34 from its normal upright position shown in FIG. 2 to the venting position shown in FIG. 3. The covering 26 is stretched outwardly in the venting position so as to allow air to flow up under the cover and into the hopper trailer as indicated by the arrows in FIG. 3.

When the member 34 is in its normal closed position, it is generally parallel to the section of the covering 26 which overlies the back end wall 14. Thus it does not interfere with the covering in any way. It is held locked in this position by the over center pivot handle 46. Lever 44 is designed so that when handle 46 is pivoted to open member 36 the latter will be generally perpendicular to the overlying covering. This not only provides for the maximum stretch of the covering but also helps to hold the member in its open position. The member 36 is furthermore locked in its open position by the complete downward positioning of over center pivot handle 46.

From the foregoing description, it is apparent that I have provided an apparatus for venting the canvas-like covering on an open top hopper bed trailer meeting all of the objectives herein set forth. While the invention has been particularly described with reference to a hopper bed trailer, it will be appreciated that the invention will find application with any type of open top container wherein the material in the container is intended to be removed relatively quickly from a point at or near the bottom and the container is covered with a flexible covering.

Having thus described my invention, I claim:

1. Apparatus for venting a flexible covering over an open top container to prevent collapse of the container during unloading of the contents thereof from a point near the bottom and wherein the covering is adapted to extend over the top and partially down the side of the container, said apparatus comprising:
   an elongated member adapted to be pivotally mounted near the top of said container and beneath said covering; said member being normally disposed in parallel relationship with the overlying covering so as not to interfere with the latter and movable into a venting position perpendicular to the covering whereby the latter is pulled away from the container;
   lever means coupled with said member and extending therefrom for effecting pivotal movement of said member between its normal and venting positions; and
   means for holding said lever means and said member in said venting position.

2. Apparatus as set forth in claim 1, wherein said container includes an open framework over the top thereof for supporting said covering and said member is adapted to be mounted beneath said framework.

3. Apparatus as set forth in claim 2, wherein said container presents a peripheral edge at the top thereof and said member is adapted to be mounted on said edge.

4. Apparatus as set forth in claim 1, wherein said member comprises a generally U-shaped component having a stretched out elongated bight portion.

5. Apparatus as set forth in claim 1, wherein the holding means comprises an over center pivot handle coupled with said lever means.

6. Apparatus as set forth in claim 1, wherein said container comprises a hopper bed of generally polygonal configuration and said flexible covering comprises a canvas-like material held to said hopper bed at a plurality of spaced points along the edge of the cover.

7. Apparatus as set forth in claim 6, wherein said member comprises a generally U-shaped component having a stretched out elongated bight portion, said member being normally disposed in a generally vertical plane and is movable into a generally horizontal plane when in said venting position.

8. In an open top hopper bed adapted to have its contents removed from a point near the bottom and provided with a flexible canvas-like covering and an open framework for supporting said covering, the improvement of apparatus for venting the covering during unloading of the contents comprising:
   an elongated member pivotally mounted near the top of said bed;
   said member being normally disposed in parallel relationship with the overlying covering so as not to interfere with the latter and movable into a venting position perpendicular to the covering whereby the latter is pulled away from the bed;
   lever means coupled with said member and extending therefrom for effecting pivotal movement of said member between its normal and venting positions; and
   means for holding said lever means and said member in said venting position.

9. The invention of claim 8, wherein said hopper bed has an uppermost peripheral edge and said member comprises a generally U-shaped component having a stretched out bight portion, said component being mounted along said peripheral edge and movable from a generally vertical position into a generally horizontal position.

* * * * *